(12) United States Patent
Ng et al.

(10) Patent No.: US 7,784,084 B2
(45) Date of Patent: Aug. 24, 2010

(54) ACCESS CONTROL AT AN INTERMEDIATE NETWORK ELEMENT CONNECTING A PLURALITY OF DATA COMMUNICATIONS NETWORKS

(75) Inventors: Chan-Wah Ng, Singapore (SG); Pek-Yew Tan, Singapore (SG); Toyoki Ue, Yokohama (JP)

(73) Assignee: Panasonic Corporation, Osaka (JP)

( * ) Notice: Subject to any disclaimer, the term of this patent is extended or adjusted under 35 U.S.C. 154(b) by 925 days.

(21) Appl. No.: 10/514,834

(22) PCT Filed: Sep. 22, 2003

(86) PCT No.: PCT/JP03/12046

§ 371 (c)(1),
(2), (4) Date: Nov. 18, 2004

(87) PCT Pub. No.: WO2004/028089

PCT Pub. Date: Apr. 1, 2004

(65) Prior Publication Data

US 2005/0177865 A1      Aug. 11, 2005

(30) Foreign Application Priority Data

Sep. 20, 2002    (JP) ............................ 2002-276195

(51) Int. Cl.
*G06F 11/30* (2006.01)

(52) U.S. Cl. ........................... 726/3; 713/153; 713/155; 713/156; 713/168; 726/1; 726/2; 726/12; 709/221; 709/223; 709/227; 714/3; 714/4; 370/218; 370/219; 370/351; 370/401

(58) Field of Classification Search ..................... 726/1, 726/2, 3, 12; 713/155, 156, 168; 709/221, 709/223, 227; 370/401
See application file for complete search history.

(56) References Cited

U.S. PATENT DOCUMENTS

| 5,941,988 A | * | 8/1999 | Bhagwat et al. ............... 726/12 |
| 6,003,084 A | * | 12/1999 | Green et al. ................. 709/227 |
| 6,229,787 B1 | * | 5/2001 | Byrne ......................... 370/218 |

(Continued)

FOREIGN PATENT DOCUMENTS

JP        2001111544        4/2001

(Continued)

OTHER PUBLICATIONS

Supplementary European Search Report dated Jul. 28, 2005.

(Continued)

*Primary Examiner*—Nasser Moazzami
*Assistant Examiner*—Shanto M Abedin
(74) *Attorney, Agent, or Firm*—Dickinson Wright PLLC

(57) ABSTRACT

An access control method for a plurality of data communications networks is disclosed that enables a plurality of local nodes (101) to communicate with each other even if the connection between an intermediate node (103) and a global server (105) is momentarily lost. In this method, when the connection to the global server (105) breaks down, the intermediate node (103) temporarily grants access to the local nodes (101) instead of the global server (105) in accordance with a predetermined policy, thus allowing operation of local networks to function normally until connection to the global network (104) is resumed.

1 Claim, 6 Drawing Sheets

U.S. PATENT DOCUMENTS

| | | | |
|---|---|---|---|
| 6,360,265 B1* | 3/2002 | Falck et al. | 709/227 |
| 6,463,474 B1* | 10/2002 | Fuh et al. | 709/225 |
| 6,757,289 B1* | 6/2004 | Cain et al. | 370/401 |
| 6,847,649 B2* | 1/2005 | Sutanto | 370/401 |
| 6,880,005 B1* | 4/2005 | Bell et al. | 709/225 |
| 6,957,247 B1* | 10/2005 | Ates | 709/203 |
| 7,093,154 B2* | 8/2006 | Bartfai et al. | 714/4 |
| 7,095,747 B2* | 8/2006 | Sarmiento et al. | 370/401 |
| 7,146,403 B2* | 12/2006 | Tock et al. | 709/206 |
| 7,155,632 B2* | 12/2006 | Vasavada | 714/4 |
| 7,171,469 B2* | 1/2007 | Ackaouy et al. | 709/225 |
| 7,185,073 B1* | 2/2007 | Gai et al. | 709/221 |
| 7,206,826 B1* | 4/2007 | Parker et al. | 709/220 |
| 7,209,466 B2* | 4/2007 | Cabana | 370/338 |
| 7,219,120 B2* | 5/2007 | Hui | 709/225 |
| 7,239,643 B2* | 7/2007 | Yoshida et al. | 370/401 |
| 7,441,262 B2* | 10/2008 | Hui et al. | 726/1 |
| 7,447,755 B1* | 11/2008 | Maxted et al. | 709/223 |
| 7,567,503 B2* | 7/2009 | Ng et al. | 370/216 |
| 7,567,538 B2* | 7/2009 | Kallio | 370/338 |
| 2002/0002688 A1 | 1/2002 | Gregg et al. | |
| 2002/0035685 A1* | 3/2002 | Ono et al. | 713/155 |
| 2002/0110123 A1* | 8/2002 | Shitama | 370/389 |
| 2002/0166080 A1* | 11/2002 | Attanasio et al. | 714/15 |
| 2002/0178365 A1* | 11/2002 | Yamaguchi | 713/182 |
| 2006/0050628 A1* | 3/2006 | Ng et al. | 370/216 |

FOREIGN PATENT DOCUMENTS

| | | |
|---|---|---|
| WO | 9859463 | 12/1998 |

OTHER PUBLICATIONS

"Port-Based Network Access Control," IEEE Standard for Local and Metropolitan Area Networks, IEEE Std 802.1X-2001, http://standards.ieee.org/getieee802/download/802.X-2001.pdf, pp. 1-134, Jul. 2001.

L. Blunk, et al., "PPP Extensible Authentication Protocol (EAP)," Network Working Group, IETF RFC 2284, pp. 1-15, Mar. 1998.

B. Patil, et al., "Protocol for Carrying Authentication for Network Access (pana)," IETF PANA WG Charter, 7 pages total, May 2002.

C. Rigney, et al., "Remote Authentication Dial in User Service (RADIUS)," Network Working Group, IETF RFC 2865, pp. 1-76, Jun. 2000.

P. Calhoun, et al., "Diameter Base Protocol," AAA Working Group, IETF Internet-Draft, Work in Progress, http://www.ietf.org/proceedings/02nov/I-D/draft-ieff-aaa-diameter-12.txt, pp. 1-143, Jul. 2002.

B. Aboba, et al., "The Network Access Identifier," Network Working Group, IETF RFC 2486, pp. 1-8, Jan. 1999.

PCT International Search Report dated Dec. 16, 2003.

* cited by examiner

ACCESS CONTROL AT AN INTERMEDIATE NETWORK ELEMENT CONNECTING A PLURALITY OF DATA COMMUNICATIONS NETWORKS

TECHNICAL FIELD

The present invention relates to the use of access control in a plurality of data communications networks. An intermediate node controls access of edge nodes to the network resources in a singular or plurality of data communications networks. The grant of access to the network resources is decided by an external entity not co-located with the intermediate node. Such a deployment scenario is especially common in, but not limited to, a wireless data communications network where the intermediate node does not make a decision on access requests because of the need to reduce the processing load, or for ease of management.

BACKGROUND ART

Information on documentation relating to prior arts referred to in this description will first be disclosed.

Non-Patent Document 1: IEEE 802.1 Working Group, "Port-Based Network Access Control", IEEE 802.1X Standard, June 2001.

Non-Patent Document 2: L. Blunk and J. Vollbrecht, "PPP Extensible Authentication Protocol (EAP)", IETF RFC 2284, March 1998.

Non-Patent Document 3: Basavaraj Patil and A. Yegin, "Charter of Protocol for carrying Authentication for Network Access", IETF PANA WG Charter, May 2002.

Non-Patent Document 4: C. Rigney, S. Willens, A. Rubens, and W. Simpson, "Remote Authentication Dial In User Service (RADIUS)", IETF RFC 2865, June 2000.

Non-Patent Document 5: P. R. Calhoun, J. Arkko, E. Guttman, G. Zorn, and J. Loughney, "Diameter Base Protocol", IETF Internet Draft: draft-ietf-aaa-diameter-12.txt, Work In Progress, July 2002.

Non-Patent Document 6: B. Aboba, "The Network Access Identifier", IETF RFC 2486, January 1999.

The Internet today has evolved to a stage where numerous peripheral data communications networks are deployed around a system of fixed network nodes. Most of these peripheral networks are controlled by different service providers or organizations. As such, these networks utilize different methods to implement access control. In addition, the underlying network infrastructures are vastly different between these peripheral networks (e.g. wireless networks versus wired-line networks). Possible access control methods are limited by the underlying network infrastructure used. As a result, there exist a wide range of access control methods.

For instance, the IEEE (Institute of Electrical and Electronics Engineers) 802.1x standard defines a network access protocol for local area networks (Non-Patent Document 1). This standard defines an extension of the IETF (Internet Engineering Task Force) Extensible Authentication Protocol (EAP) (Non-Patent Document 2) for use in an IEEE 802 network, such as the IEEE 802.3 Ethernet or IEEE 802.11 Wireless network. Another example would be the ongoing effort of IETF in the Protocol for carrying Authentication for Network Access (PANA) Working Group (Non-Patent Document 3). Such network access protocols are usually deployed for local area networks, where the access control messages are limited to the local network.

In some situations, it might be necessary to transport the access control messages beyond the local are a network. For instance, the server that grants access may be located in a different local area network. Such situations occur when a single administrative domain consists of a number of local area networks. A central access server is usually used to control these local area networks since it is easier to manage and maintain access information if it is collected in one central area, rather than being distributed to various local area networks. Furthermore, such a scenario is becoming more and more common with the widespread deployment of mobile network infrastructure, where a mobile terminal may be roaming in a plurality of wireless networks in one remote area, and authenticated by a server in its home area.

For these situations, a protocol capable of traversing one or more packet switched networks is usually desired. Examples of such protocols are the widely deployed Remote Authentication Dial In User Service (RADIUS) protocol (Non-Patent Document 4), and the Diameter (DIAMETER) Protocol (Non-Patent Document 5) of the IETF, which is currently being defined. These protocols are typically used to provide a backbone infrastructure for authentication, authorization, and accounting servers to communicate among each other. Because these protocols are usually quite extensive, it is often considered too expensive (in both a computation and memory sense) to deploy in end terminals.

A typical deployment will be for terminals to use a local access protocol, such as IEEE 802.1x, to perform access requests to a local intermediary. This intermediary then contacts a remote global server using RADIUS or DIAMETER that performs the actual authorization and authentication. Such an arrangement is most commonly seen in, but not limited to, a wireless network environment where the wireless mobile node uses EAP to request access, and the wireless access point uses RADIUS or DIAMETER to verify the wireless user with a server on the wired network.

In a network access environment where the local nodes uses one or more local access protocols such as PANA, IEEE 802.1x, or other EAP-based protocols, and the global authentication server uses another global access protocol such as DIAMETER or RADIUS, there is no efficient way of maintaining the sessions between the two protocols at the intermediary. In addition, implementation of an intermediary is often tightly coupled to the access protocols, so that the change of an access protocol would require substantial effort to modify the intermediary.

Of the studied prior arts, only DIAMETER (Non-Patent Document 5) specifies the possibility of an intermediary capable of linking two different protocols, known as a "translation agent". However, specification of such an agent is absent. For 802.1x (Non-Patent Document 1), an intermediate "authenticator system" is defined. This, however, is confined to an intermediary using the same 802.1x protocol when communicating with both end-points of an authentication session. The charter of the PANA working group (Non-Patent Document 3) specifically identifies the PANA protocol to be used within one hop, i.e. there can be no intermediary using a PANA protocol to communicate with both the local node and the global server. The intermediary, in such cases, will have to use a different protocol to relay an authentication session to the global authentication server. Unfortunately, the architecture and operation of such an intermediary is not defined.

Furthermore, since many deployments of such an intermediary are in a wireless environment, it is highly possible to envisage an intermediary which is itself mobile, such as a wireless access point in a train or aircraft. With such settings, there is a significant possibility that the connection between the intermediate node and the global server may be momentarily down. This is especially true when there is a high frequency of handovers between base stations. Most implementations of access control are not optimized for such a scenario. Often, access requests of local nodes are rejected or put on hold when the intermediate node cannot locate the global server. This is counter-productive if the local nodes just need to communicate with each other.

DISCLOSURE OF INVENTION

It is an object of the present invention to provide an access control method in a plurality of data communications networks that enables a plurality of local nodes to communicate with each other even when connection between an intermediate node and global server is momentarily lost.

The present invention allows the intermediary to employ a high level state machine to synchronize between two or more access protocols. In particular, the actual access protocols used are abstracted to a set of generic control messages for use in the state machine. As such, the problem of changing access protocols is limited to just the change in the affected protocol.

In addition, the invention disclosed in this description is designed with frequent temporary loss of connections taken into consideration. Thus, it has means of allowing local nodes to communicate with each other even when the global server cannot be contacted.

The present invention involves operation of an intermediate node controlling access of local nodes in a singular or plurality of data communications networks. When a local node requires network access, the intermediate node is configured to contact a global server to authorize the request. The protocols used by the local nodes and global server can be identical or different. When connection to the global server is momentarily lost, the present invention allows the intermediary to temporarily grant network access to the local nodes, so that local nodes can still communicate with each other.

BEST MODE FOR CARRYING OUT THE INVENTION

With reference now to the accompanying drawings, embodiments of the present invention will be explained in detail below.

An apparatus for controlling network resources at an intermediate network element is disclosed here. To help understand the present invention, the following definitions are used:

A "packet" is a self-contained unit of data of any possible format that can be delivered on a data network.

An "intermediary", an "intermediate network element", and an "intermediate node" are equivalent, and are used interchangeably, unless otherwise specified, to refer to a gateway, an access router or an intelligent network hub to which the present invention applies.

In the following description, for the purpose of explanation, specific numbers, times, structures, and other parameters are set forth in order to provide a thorough understanding of the present invention. However, it will be apparent to anyone skilled in the art that the present invention may be practiced without these specific details.

Figure 1:
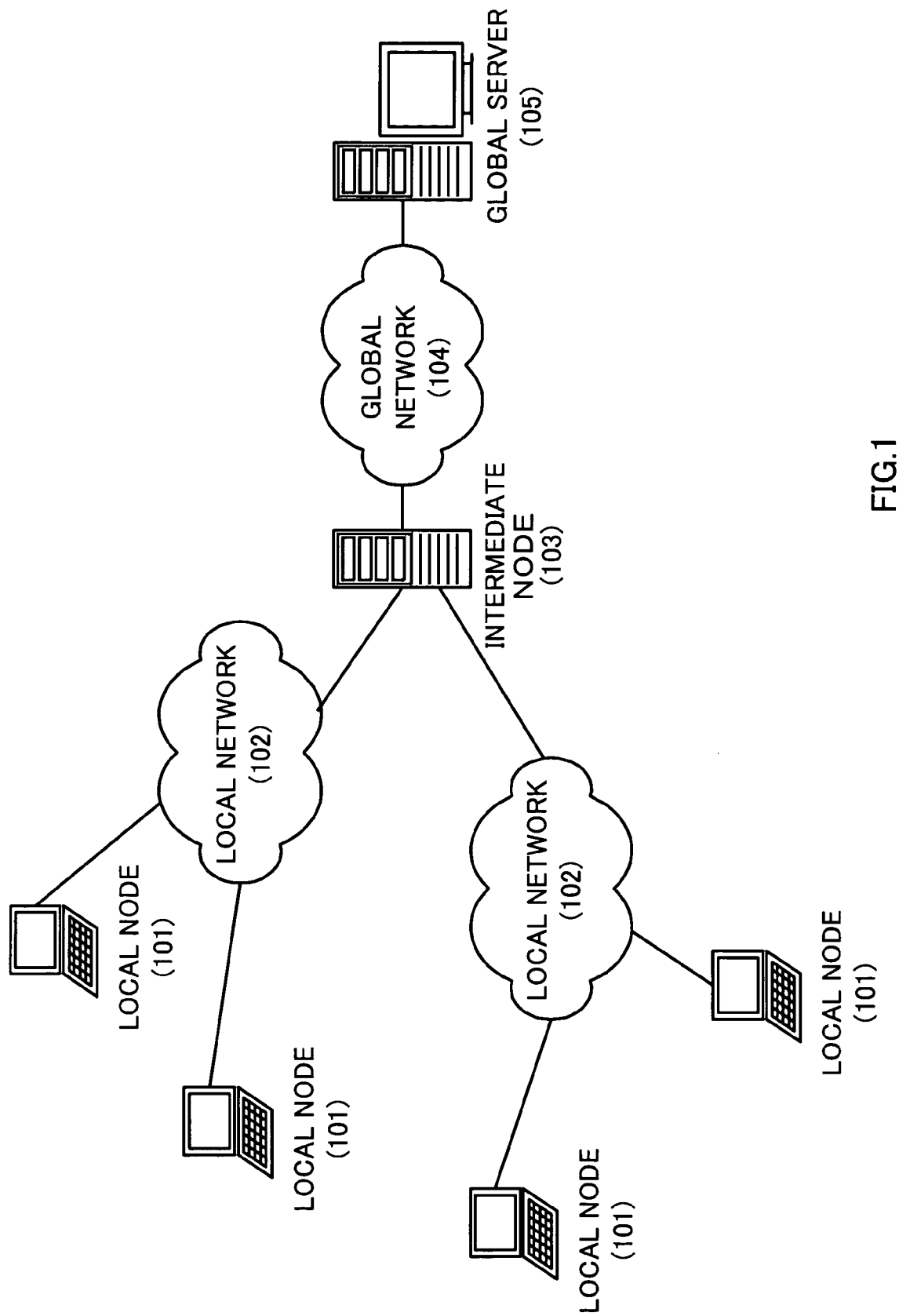
FIG. 1 is a drawing showing a communication network scenario, illustrating communication networks connected to an intermediate network node in a typical scenario. With the aid of the global server, the intermediate node controls access to local and global network resources by the local nodes.

The invention disclosed in this description is designed to be employed in an intermediate network node, which is connected to two or more data communications networks, as illustrated in FIG. 1. The subject of the present invention, the intermediate node (103) controls access to local networks (102) and a global network (104) by local nodes (101). Whenever there is a new local node (101) requesting network access, the intermediate node (103) will have to consult the global server (105), which is the authority in granting network access to local nodes (101).

Figure 2:
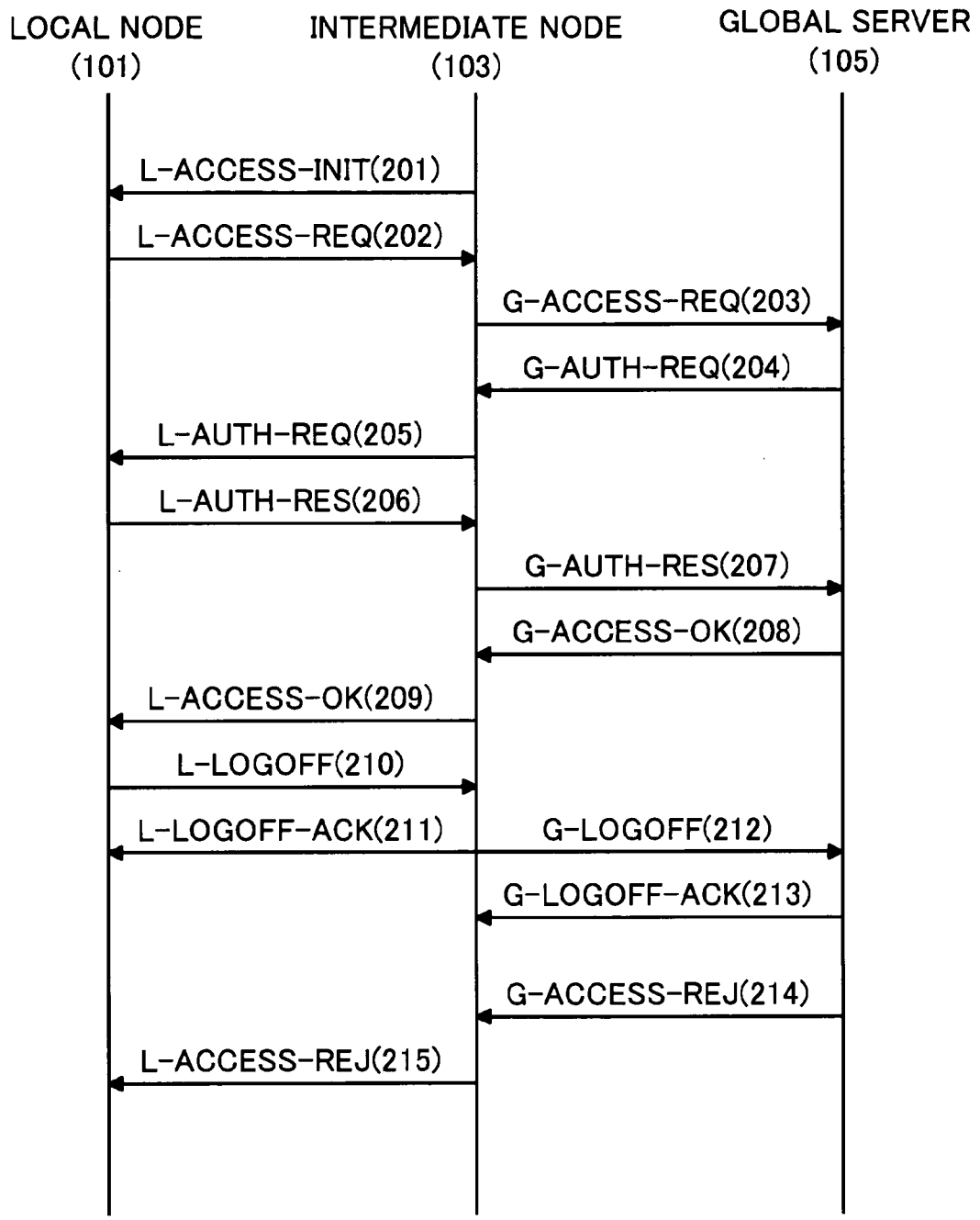
FIG. 2 is a drawing showing a message flow sequence in access control, depicting a general flow sequence of control messages when performing access control of a local node by a global server. The intermediate node is functioning as a relaying agent between the local node and the global server. Fourteen generic control messages are shown here.

FIG. 2 illustrates a typical flow sequence of control messages between the intermediate node (103), a local node (101) and the global server (105).

Usually, the local node (101) will have to request access by sending the intermediate node (103) a local access request message, as signified by L-ACCESS-REQ (202). This message will normally identify the local node (101), and state the network resources required. However, a local node (101) may assume that such a request is not necessary and directly attempt to use network resources, such as by sending data packets to a single or plural number of nodes in other local networks (102) or the global network (104). When the intermediate node (103) receives such packets from a local node (101) that has not been previously granted access (or for which a previous grant has expired), the intermediate node (103) can notify the local node (101) to send an L-ACCESS-REQ (202) message by sending an L-ACCESS-INIT (201) message.

When the intermediate node (103) receives an L-ACCESS-REQ (202), it then contacts the global server (105) with a G-ACCESS-REQ (203) message. This control message informs the global server of the new access request from the local node (101). The global server (105) can then accept, reject, or authenticate the request. To accept the request, the global server (105) sends the intermediate node (103) a G-ACCESS-OK (208) message. When the intermediate node (105) receives this, it grants access to the local node (101) by sending an L-ACCESS-OK (209) message to the local node (101). From this point on, the local node (101) can access the requested network resource until it chooses to release it, or until the grant expires.

To release the network resource, the local node (103) can send the intermediate node (103) an L-LOGOFF (210) message. The intermediate node (103) will acknowledge the release by replying with an L-LOGOFF-ACK (211) message. At the same time, it will inform the global server (105) that the local node (105) has released the resource by sending a G-LOGOFF (212). The global server (105) acknowledges with a G-LOGOFF-ACK (213) control message. It must be noted that acknowledgement of the release of network resources is optional. In such cases, the L-LOGOFF-ACK (211) and G-LOGOFF-ACK (213) control messages are unnecessary.

When the global server (105) rejects the request, it sends the intermediate node (103) a G-ACCESS-REJ (214) control message. Upon receiving this, the intermediate node notifies the local node (101) with an L-ACCESS-REJ (215) message.

Alternatively, the global server (105) can choose to authenticate the local node (101) by sending the intermediate node (103) a G-AUTH-REQ (204) message. The intermediate node (103) relays this with an L-AUTH-REQ (205) message to the local node (101). The local node (101) will have to respond to the authentication with an L-AUTH-RES (206) message sent to the intermediate node (103). The intermediate node (103) forwards this to the global server (105) with a G-AUTH-RES (207) control message. The global server (105) can then accept or reject the request based on the authentication response. In addition, it can choose to further authenticate the local node (101) with another G-AUTH-REQ (204) control message.

Due to the fact that L-LOGOFF-ACK (211) and G-LOGOFF-ACK (213) messages are optional, two sets of generic control messages can be identified: first, the full set consisting of all fifteen messages defined above, as cited in feature (3) described later herein, and second, a reduced set consisting of only thirteen messages, without the L-LOGOFF-ACK (211) and G-LOGOFF-ACK (213) messages, as cited in feature (2) described later herein.

As clearly shown in the above illustration, the intermediate node (103) will have to maintain states during an access request session to synchronize between the messages sent from and to the local node (101), and the messages sent to and from the global server (105). To facilitate this, the data structure shown in Data Format 1 below, as cited in feature (8) described later herein, is defined.

---
Data Format 1:
The SESSION Structure.

```
typedef struct __session_tag__ {
    NODE_INFO  local_node_info;
    STATE      state;
    BUFFER     packet[ ];
} SESSION;
```
---

The data format SESSION contains three major fields, local_node_info, state, and the packet array. The local_node info field is used to store the identification information of the local node (101). This can include user identification, network access identifier (Non-Patent Document 6), and some unique identifier of the network interface card. The state field is used to store the current status of the access request. Its usage will become apparent later in this description when the operation of the intermediate node (103) is disclosed further.

The packet array is used to temporarily store outgoing data packets sent from or to the local node (101) when the access request of the local node (101) is pending, or when there is a temporary loss of global network connectivity. Use of the packet array will be disclosed further later in this description.

To successfully maintain the two sessions, one between the local node (101) and the intermediary, and the other between the intermediary and the global server (105), a set of states and transitions among the states is needed. Features (11) and (12) described later herein specify the minimal set of states and state transitions that is crucial for the operation of the present invention. However, in order for the present invention to operate correctly, a more complete set of states and state transitions is necessary. Two such complete sets are disclosed in this document, as described by the state transition diagrams shown in FIG. 3 and FIG. 4, with reference to features (14), (15), (17) and (18) described later herein. It should be apparent to anyone skilled in the art that other sets of states and state transitions can be defined to implement the invention disclosed. Nonetheless, such a set will incorporate in some form the minimal set cited in features (11) and (12) described later herein.

Figure 3:
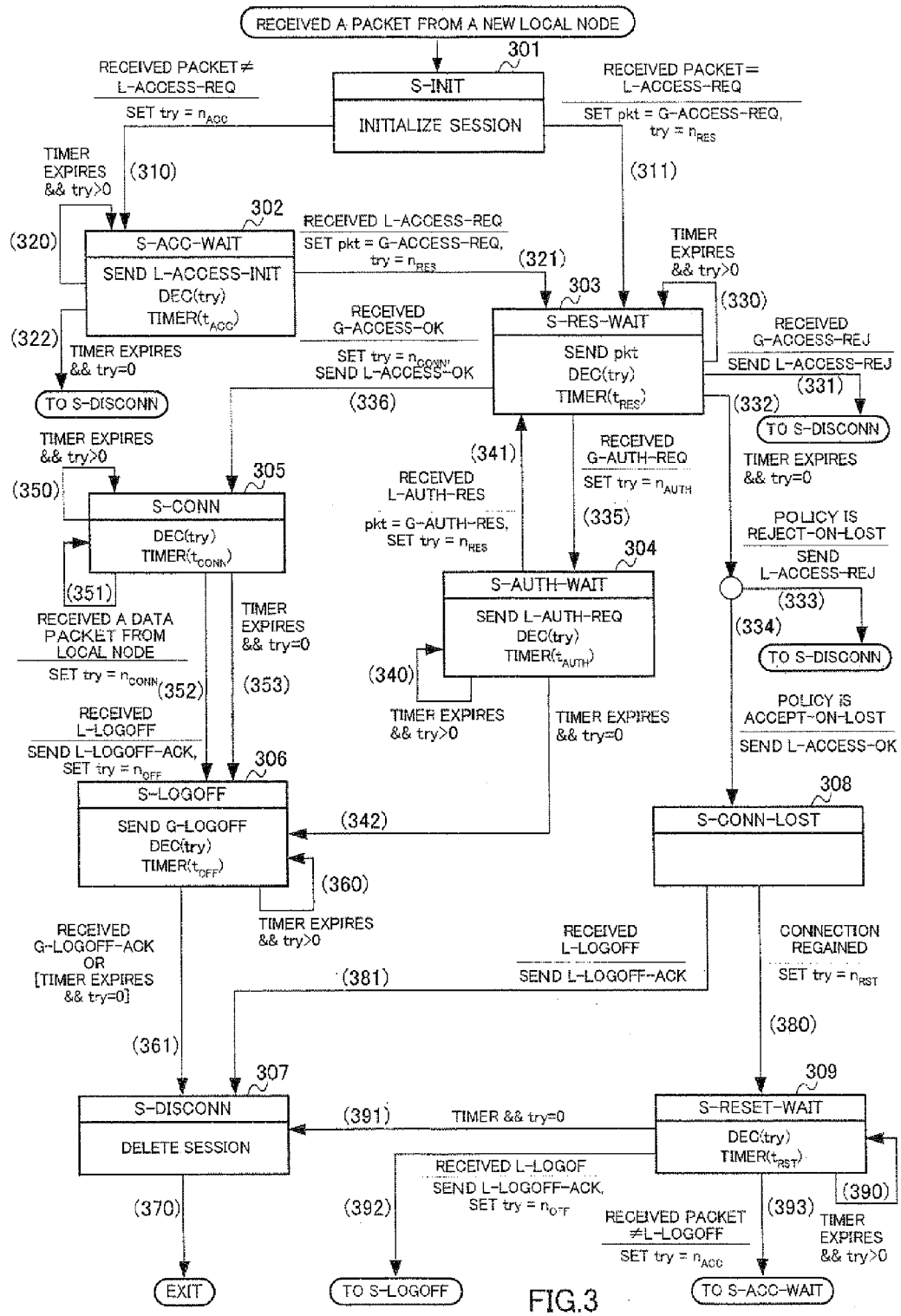
FIG. 3 is a state transition diagram showing state transitions when the intermediate node receives a new data packet from a local node that has no active session associated with it.

FIG. 3 is the state diagram when the set of generic control messages includes the L-LOGOFF-ACK and G-LOGOFF-ACK messages. When these messages are not necessary, the state diagram can be simplified to the one shown in FIG. 4. A total of nine distinct states are defined, as follows:

S-INIT (301):

The initial state when a new packet is received from a local node (101) that has not previously been granted access, and has no pending access grant. A new SESSION structure will be allocated and initialized for this local node (101). The SESSION structure will continue to exist until the S-DIS-CONN (307) state is reached. Thus a method of checking if a local node (101) has any pending or granted access is to check if there is an active SESSION structure associated with the local node (101) by locating a SESSION structure that has similar local_node_info.

This state is a transient state in that it will always transit to a different state. The state it transits to depends on the received packet type. If the received data packet is an L-ACCESS-REQ (202) message, then the next state will be S-RES-WAIT (303), as indicated by the transition denoted by literal 311. At this transition, the variable "try" is set to number $n_{RES}$, which defines the number of G-ACCESS-REQ (203) messages to be sent before declaring that connection has failed. If the packet received is an ordinary data packet, then the next state will be S-ACC-WAIT (302), as indicated by the transition denoted by literal 310. At this transition, the variable "try" is set to number $n_{ACC}$, which defines the number of L-ACCESS-INIT (201) messages to be sent before declaring that connection has failed.

S-ACC-WAIT (302):

This state is entered when the intermediate node (103) receives an ordinary packet from a local node (101), from which it has not received an L-ACCESS-REQ (202). This is the state in which the intermediate node (103) is waiting for the local node (101) to send an L-ACCESS-REQ (202) message. Once this state is entered, an L-ACCESS-INIT (201) message will be sent to the local node (101), and the variable "try" will be decremented. At the same time, a timer of value $t_{ACC}$ will be started. When this timer expires, a new state transition is triggered. If "try" is greater than zero, a self-transition takes place, i.e. the S-ACC-WAIT (302) state is re-entered, as indicated by the transition denoted by literal 320.

On the other hand, if the timer expires with "try" equal to zero, the attempt at connection with the local node (101) is deemed to have failed, and the next state of transit is S-DIS-CONN (307), as indicated by the transition denoted by literal 322. A state transition to S-RES-WAIT (303) can occur regardless of the timer when an L-ACCESS-REQ (202) message is received from the local node (101). This is the expected state transition. During this transition the variable "pkt" is set to G-ACCESS-REQ (203), and "try" is set to $n_{RES}$, as denoted by literal 321.

S-RES-WAIT (303):

This state is entered when the intermediate node (103) receives an L-ACCESS-REQ (202) from the local node (101). This is the state in which the intermediate node (103) is waiting for the global server (105) to send back a response, in the form of a G-ACCESS-OK (208) to accept the access request, a G-ACCESS-REJ (214) to reject the access request, or a G-AUTH-REQ (204) to authenticate the access request.

Upon entering this state, the intermediate node (103) will send a G-ACCESS-REQ (203) or a G-AUTH-RES (207) to the global server (105) depending on the value of "pkt", decrement the variable "try", and start a timer of value $t_{RES}$. When this timer expires, a new state transition will be triggered. If "try" is greater than zero, a self-transition takes place, i.e. the S-RES-WAIT (303) state is re-entered, as indicated by the transition denoted by literal 330. If "try" is zero when the timer expires, the transition denoted by literal 332 will be taken. Depending on the policy of intermediate node (103) as cited in features (9) and (10) described later herein, the next state will be either S-CONN-LOST (308) or S-DIS-CONN (307). If the policy is to assume that access is granted when the intermediate node (103) cannot contact the global server (105) (on-lost), the next state will be S-CONN-LOST (308), and an L-ACCESS-OK (209) message will be sent to the local node (101), as indicated by the transition denoted by literal 334. On the other hand, if the policy is to assume that access is denied when connection to global server (105) is lost (on-lost), then the next state will be S-DISCONN (307), and an L-ACCESS-REJ (215) message is sent to the local node (101), as indicated by the transition denoted by literal 333.

Transitions to other states from S-RES-WAIT (303) can occur even when the timer has not expired. This happens when the intermediate node (103) receives a message from the global server (105). If the received message is a G-AC-CESS-REJ (214), transition to the state S-DISCONN (307) will occur, as denoted by literal 331. At the transition, an L-ACCESS-REJ (215) will be sent to the local node (101). If the received message is a G-ACCESS-OK (208), transition to the state S-CONN (305) will occur, as denoted by literal 336. During this transition, an L-ACCESS-OK (209) message is transmitted to the local node (101), and the variable "try" is set to $n_{CONN}$. Otherwise, if the received message is a G-AUTH-REQ (204), the next state will be S-AUTH-WAIT (304) During this transition denoted by literal 335, the variable "try" is set to $n_{AUTH}$.

S-AUTH-WAIT (304):

This state is entered when the intermediate node (103) receives a G-AUTH-REQ (204) from the global server (105). This is the state in which the intermediate node (103) is waiting for the local node (101) to respond to the authentication with an L-AUTH-RES (206) message. When this state is entered, an L-AUTH-REQ (205) is sent to the local node (101) and the variable "try" is decremented. In addition, a timer of value $t_{AUTH}$ will be set.

When this timer expires or a response is received from the local node (101), a state transition will occur. If the timer expires with "try" greater than zero, a self-transition will occur, as denoted by literal 340. If "try" is zero when the timer expires, it is assumed that connection with the local node (101) is lost, and the next state will be S-LOGOFF (306) if the full set of generic control messages is used (FIG. 3), as indicated by the transition denoted by literal 342. On the other hand, if the reduced set of generic control messages is used, the next state will then be S-DISCONN (307), as indicated by the transition denoted by literal 442.

State transitions can also occur when the intermediate node (103) receives an L-AUTH-RES (206) response from the local node (101). In this case the next state is S-RES-WAIT (303). The variable "try" is set to $n_{RES}$ and the variable "pkt" set to G-AUTH-RES (207), as indicated by the transition denoted by literal 341.

S-CONN (305):

This state is entered when the intermediate node (103) receives a G-ACCESS-OK (208) message indicating that the access request of the local node (101) is granted. Upon entering this state, the variable "try" will be decremented, and a timer of value $t_{CONN}$ will be set. When the timer expires, a state transition will occur. If "try" is greater than zero when the timer expires, a self-transition will occur, as denoted by literal 350. If "try" is zero when the timer expires, the connection with the local node (101) is assumed to be lost, since the intermediate node (103) has not received any packets from the local node (101).

When this happens, the transition denoted by literal 353 to the state S-LOGOFF (306) will be taken, when the full set of generic control messages is used (FIG. 3). If the reduced set is used (FIG. 4), a transition as denoted by literal 452 will be taken, which leads directly to the S-DISCONN (307) state. During the transition denoted by literal 452, a G-LOGOFF (212) message will be sent to the global server (105).

Even when the timer has yet to expire, state transitions can still occur when the intermediate node (103) receives packets from the local node (101). If the packet received is an L-LOGOFF (210) message to indicate the release of network resources, the next state will be S-LOGOFF (306) for the full set of generic messages (FIG. 3). During this transition denoted by literal 352, the intermediate node (103) will send an L-LOGOFF-ACK (211) message to the local node (101) and set the variable "try" to a variable of $n_{OFF}$.

On the other hand, if the reduced set is used (FIG. 4) the transition denoted by literal 452 will be taken, leading to the state S-DISCONN (307). During the transition denoted by literal 452, a G-LOGOFF (212) message will be sent to the global server (105). However, if the packet is a normal data packet, a self-transition to S-CONN (305) will occur, and the variable "try" is reset to the value of $n_{CONN}$, as indicated by the transition denoted by literal 351.

S-LOGOFF (306):

This state is entered when the intermediate node (103) receives an L-LOGOFF (210) message from the local node (101), and the full set of generic control messages is used (FIG. 3). This is the state in which the intermediate node (103) sends the global server a G-LOGOFF (212) message, and waits for the G-LOGOFF-ACK (213) acknowledgement. Once this state is entered, a G-LOGOFF (212) message is sent to the global server, and the variable "try" is decremented. Furthermore, a timer of value $t_{OFF}$ will be set. When the timer expires with "try" greater than zero, a self-transition occurs, as indicated by the state transition denoted by literal 360. If the timer expires with "try" equal to zero, or if a G-LOGOFF-ACK (213) message is received from the global server (105) a state transition (361) to S-DISCONN (307) will occur.

S-DISCONN (307):

This state is entered when the intermediate node (103) decides that the local node (101) no longer requires the network resources. Upon entering this state, the SESSION data structure associated with the local node (101) will be deleted. No more state transitions will occur.

S-CONN-LOST (308):

This state is entered when the intermediate node (103) decides that connection to the global network (104) is lost, and the policy is to assume that an access request of the local node (101) is granted until connection to the global network (104) is restored. The session will always stay in this state until it receives an L-LOGOFF (210) message from the local node (101), or until connection to the global network (104) is restored.

In the former case, an L-LOGOFF-ACK (211) message is returned to the local node (101) and the next state is S-DISCONN (307), as indicated by the transition denoted by literal 381, if the full set of generic control messages is used (FIG. 3). If the reduced set is used instead (FIG. 4), the next state is S-DISCONN (307), as indicated by the transition denoted by literal 481. On the other hand, if connection to the global network (104) is restored, the state will be S-RESET-WAIT (309). During this transition denoted by literal 380, the variable "try" is set to a value of $n_{RST}$.

S-RESET-WAIT (309):

This state is entered when the intermediate node (103) has just regained connection to the global network. This is the state in which it is waiting to receive a packet sent by the local node (101) to verify that the local node (101) is still active, before resuming the previous access request session. When this state is entered, the variable "try" is decremented and a timer is set with value $t_{RST}$. When this timer expires and "try" is greater than zero, a self-transition (390) occurs.

Otherwise, if this timer expires with "try" equal to zero, the local node (101) is assumed to no longer need the network resources. In this case, a transition as denoted by literal 391 to the state S-DISCONN (307) occurs. When a packet is received from the local node (101), the session will leave this state. If the packet is an L-LOGOFF (210) message, the next state will be S-LOGOFF (306), if the full set of generic control messages is used (FIG. 3).

Together with this state transition denoted by literal 392, the variable "try" is set to $n_{OFF}$ and the local node is acknowledged with an L-LOGOFF-ACK (211) message. Otherwise, if the reduced set is used instead (FIG. 4), the next state will be S-DISCONN (309), as indicated by the transition denoted by literal 492. During this transition 492, a G-LOGOFF (212) control message will be sent to the global server (105).

On the other hand, if the packet received is not an L-LOGOFF (210) message, the local node is still actively using the network resource, and thus the access request session must be resumed. This is indicated by the state transition, denoted by literal 393, to the state S-ACC-WAIT (302). During this transition, the variable "try" is set to $n_{ACC}$.

In the above description of the state diagrams, a few references are made to $n_{ACC}$, $n_{RES}$, $n_{AUTH}$, $n_{RST}$, $n_{CONN}$, and $n_{OFF}$. These are "retryparameters" employed to control the number of re-transmission attempts. It should be apparent to anyone skilled in the art that should re-transmission of any of the control packets not be desired, or be otherwise prohibited, the state transition diagram disclosed is still applicable by setting the corresponding "retry parameter" to a value of 1. In addition, a few references are made to $t_{ACC}$, $t_{RES}$, $t_{AUTH}$, $t_{CONN}$, $t_{RST}$, and $t_{OFF}$. These are time-out parameters to control the re-transmission period and state transition timing.

The present invention allows the intermediate node (103) to temporarily grant access to local nodes (101) when the connection to the global network (104) is down. As cited in features (9) and (10) described later herein, this is a configurable option, depending on policy. Such a configuration option, in its simplest form, can manifest itself as a bit, where a bit value of zero implies that the policy is to temporarily reject access, and a bit value of one implies that the policy is to temporarily grant access. It should be apparent to anyone skilled in the art that other forms of implementation are possible, such as using a string of bits to indicate the switching on or off of the configuration option.

During the period when connection to the global network (104) is down, if the policy is to grant the local node (101) access, all data packets sent to other local nodes (101) in the local networks (102) connected to the intermediate node (103) are forwarded. All data packets destined for the global network (104), however, cannot be forwarded. These are stored in a buffer associated with the local node (101), as cited in features (26) and (27) described later herein.

For this purpose, the packet array in the SESSION structure is used. This can be used to store data packets sent by the local node (101) destined for the global network (104) when connection to the global network (104) is down. When connection is restored and access has been granted by the global server (105), packets queued in the packet array are then processed as if they are received after access has been granted.

The packet array can also be used when connection to the global network (104) is alive. This is to store data packets sent by the local node (101) to any destination, including the local network (102), when the access request has yet to be granted by the global server (105), as cited in features (24) and (25) described later herein. For instance, it is when the session is still in the state S-RES-WAIT (303) or S-AUTH-WAIT (304). Once the access has been granted, data packets queued in the packet array are then processed as if they are received after access has been granted.

Figure 4:
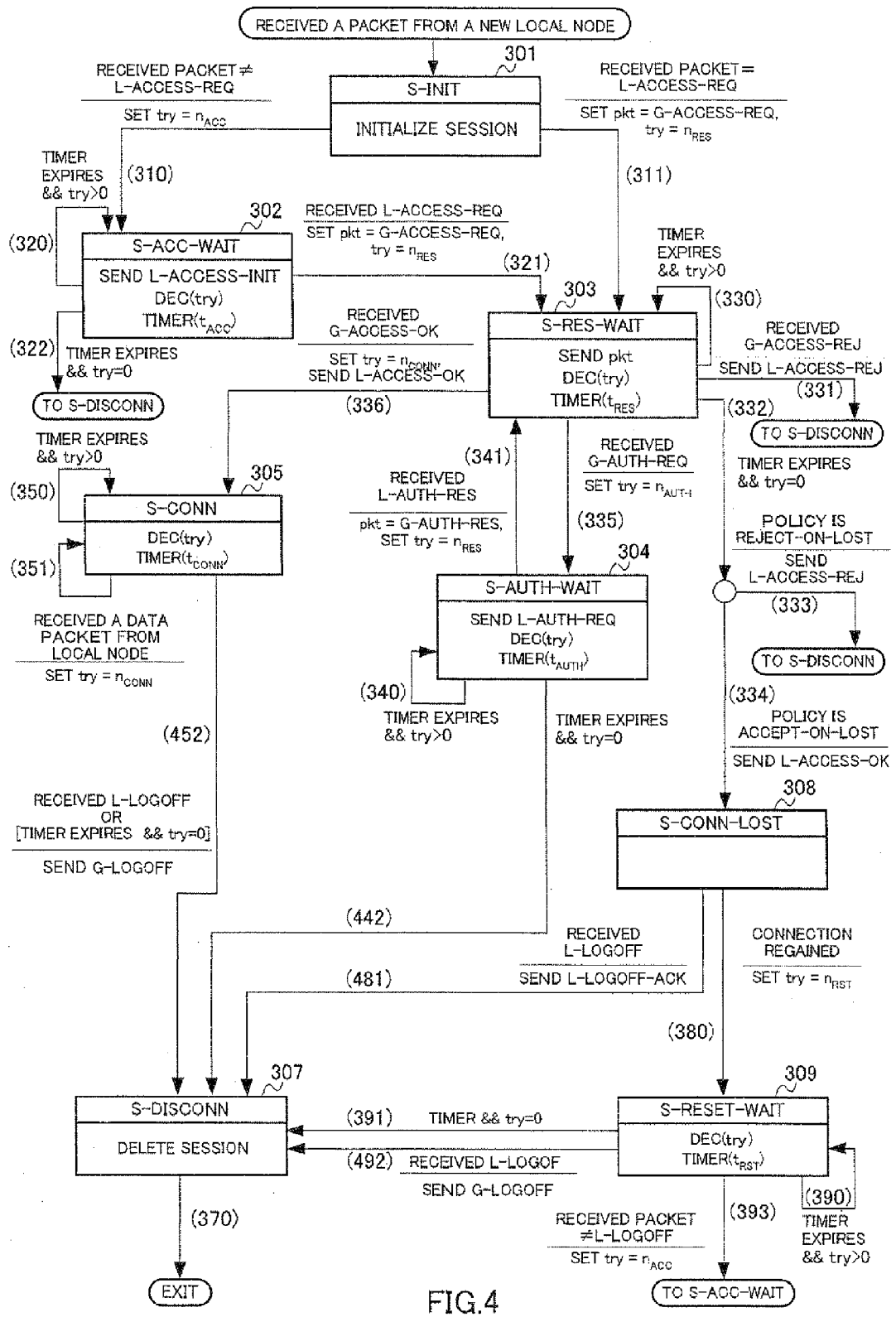
FIG. 4 is a state transition diagram showing state transitions when the intermediate node receives a new data packet from a local node that has no active session associated with it. This state diagram is simplified from FIG. 3 when an acknowledgement for release of network resources is unnecessary.
Figure 5:
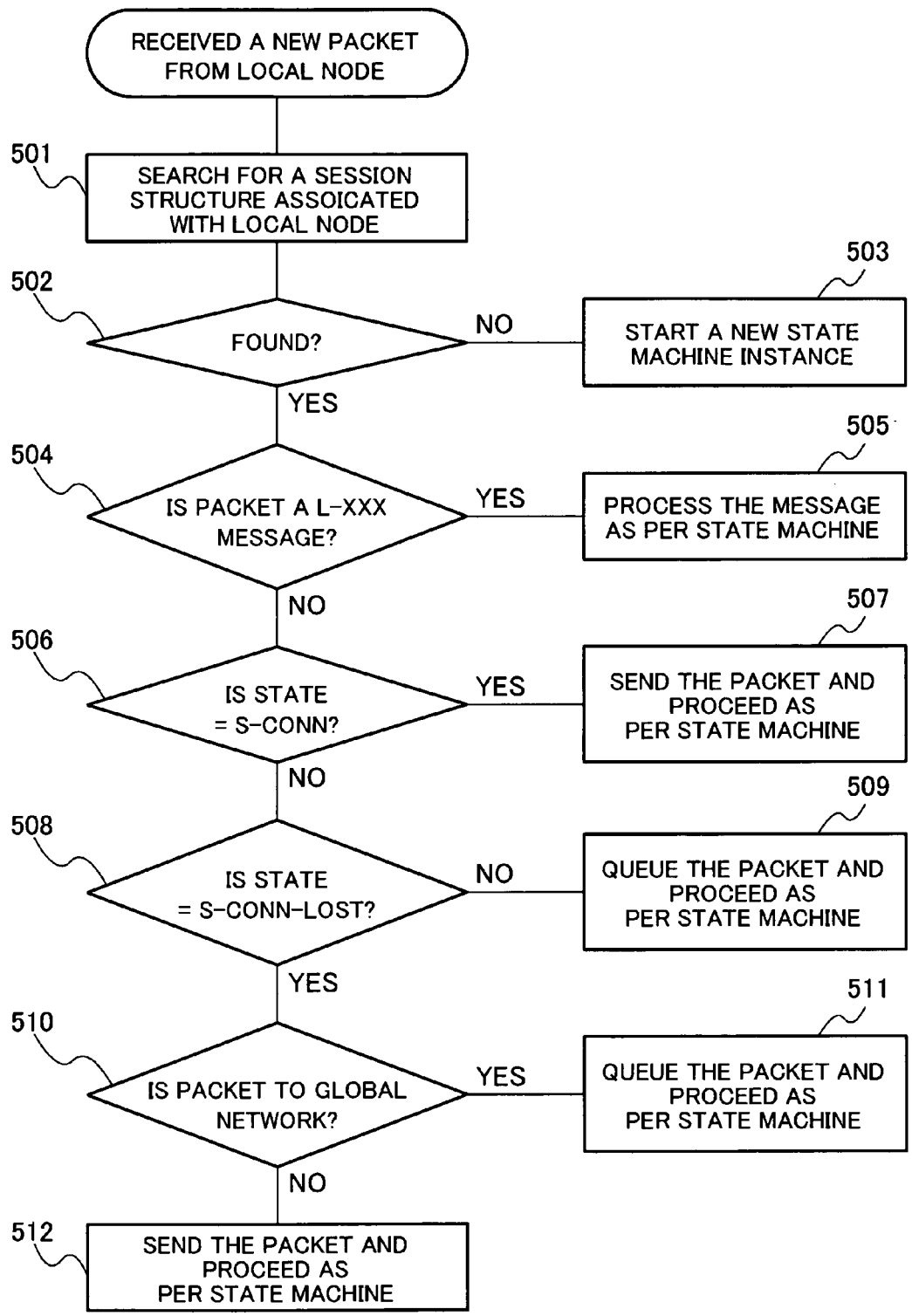
FIG. 5 is a flowchart for processing packets, depicting the algorithm employed by the intermediate node to process a packet received from a local node.

FIG. 5 illustrates the algorithm used by the intermediate node (103) when a packet is received from the local node (101), with reference to features (22) and (23) described later herein. The list of SESSION structures is first searched to locate a SESSION that is associated with the local node (101), as shown in the step denoted by literal 501. This search can be a simple search through all the SESSION structures, or a hash function on the local_node_info field can be used. If no structure is found, a new state machine governed by the state machine shown in FIG. 3 or 4 is instantiated, as shown in the steps denoted by literals 502 and 503.

If a SESSION structure is found, the packet is next checked to see if it is an L-ACCESS-REQ (202), L-AUTH-RES (206), or L-LOGOFF (210) message, as indicated by the step denoted by literal 504. If it is, the message is processed as dictated by the state transition diagram, as shown in the step denoted by literal 505. Otherwise, the state is checked to see if it is S-CONN (305) or S-CONN-LOST (308), as shown in the steps denoted by literals 506 and 508.

If the state is S-CONN (305), the packet is sent in the normal way and the state machine proceeds to the next state, as indicated by the step denoted by literal 507. Otherwise, if the state is S-CONN-LOST (308), the packet is checked to see if it is destined for the global network (104) or local network (102). If the packet is destined for the local network (102), it is sent and the state machine proceeds to the next state, as shown in the step denoted by literal 512. If the packet is destined for the global network (104), it is queued to the SESSION structure and the state machine proceeds to the next state, as shown in the step denoted by literal 511. On the other hand, if the state is neither S-CONN (305) nor S-CONN-LOST (308), the step denoted by literal 509 is taken. In this step, the packet is queued to the SESSION structure and the state machine proceeds to the next state.

In any practical implementation of the disclosed invention, it is only reasonable to set a limit on the number of packets to be queued. If more packets need to be queued when the packet array is full, the incoming packets can be silently discarded. Furthermore, it should be obvious to someone skilled in the art that by setting the size of the packet array to zero, the present invention is reduced to a system where no queuing of packets is performed.

Figure 6:
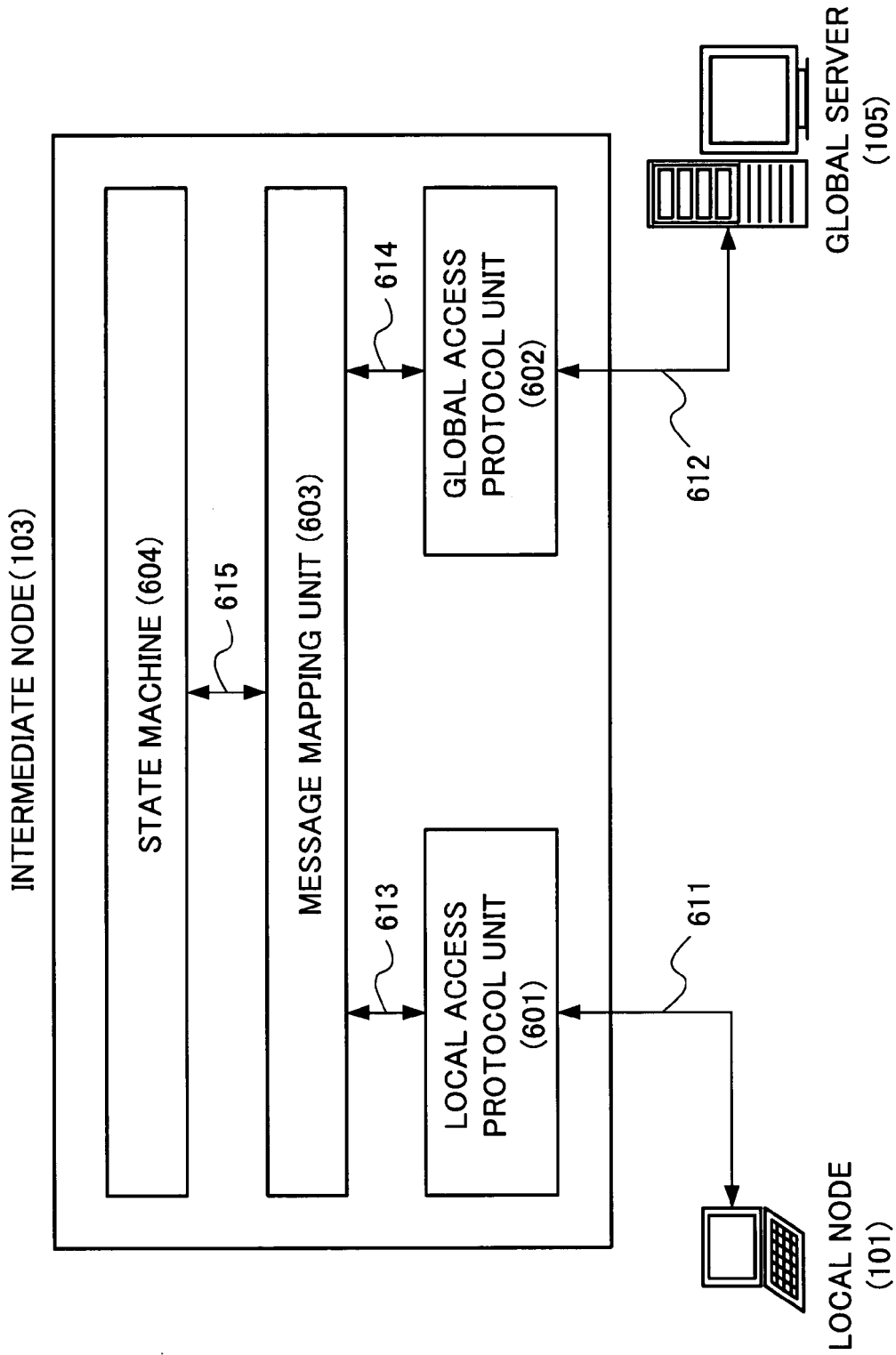
FIG. 6 is a drawing showing the architecture of the intermediate node, consisting of local and global access protocol units to handle access protocol messages used by local nodes and the global server, a message mapping unit that maps the actual access protocol messages to one of the 15 generic control messages, and a state machine that implements the state transition diagram.

With reference to feature (1) described later herein, FIG. 6 depicts the architecture of the intermediate node (103). It consists of a singular or plurality of local access protocol units (601) that handle the access protocol used by local nodes (101) in the local networks (102), and a singular or plurality of global access protocol units (602) that handle the access protocol used by the global server (105).

Messages to and from the local node (101) are handled by the local access protocol unit (601) as indicated by the data path denoted by literal 611. Messages to and from the global server (105) are handled by the global access protocol unit (602) as indicated by the data path denoted by literal 612. The architecture shown in FIG. 6 also contains a message mapping unit (603), which maps the messages used by the local and global access protocols to one of the fifteen control messages defined in FIG. 2, and the state machine (604), which implements the state transition diagram described in FIG. 3 or FIG. 4.

Messages from the local access protocol unit (601) and global access protocol unit (602) are mapped to a generic control message, as shown by the data paths denoted by literals 613 and 614 respectively. The mapped messages are then passed to the state machine (604), as shown by the data path denoted by literal 615. When the state machine (604) decides to transmit messages to the local node (101) or global server (105), these messages are passed to the message mapping unit (603) via the data path denoted by literal 615 to be mapped to the actual control messages. The actual control messages are passed down to the local access protocol unit (601) or global access protocol unit (602) via the data paths denoted by literals 613 and 614 respectively, to be sent to the local node (101) or global server (105).

It is up to implementers to use the full set of fifteen generic control messages, or the reduced set without L-LOGOFF-ACK (211) and G-LOGOFF-ACK (213). The message mapping unit (603) should work accordingly, as cited in features (4) and (5) described later herein. In fact, with reference to features (6) and (7) described later herein, a general solution is to use the full set, where the L-LOGOFF-ACK (211) generic message maps to a null message, i.e. no actual control message is sent by the local access protocol unit (601), and the G-LOGOFF-ACK (213) generic message maps to a virtual message, wherein the message is always implied to have been received whenever a G-LOGOFF message is sent.

Similarly, implementers can base the state machine (604) on the state transition diagram disclosed in FIG. 3 or FIG. 4, according to the choice of use of the full set of generic control messages, as cited in feature (17) described later herein, or use of the reduced set of generic control messages, as cited in feature (19) described later herein. In fact, a general solution is to use the state transition diagram depicted in FIG. 3. When the reduced set of generic control messages is used, one can derive the operation of the state transition diagram illustrated in FIG. 4 by setting $n_{OFF}$ to one, and the timer value $t_{OFF}$ to a very small value, such as one microsecond, as cited in features (21) and (22) described later herein.

The present invention allows an intermediary controlling the network access of local network nodes in a singular or plurality of local data communications networks. It allows the decision to grant network access to be located in an external global server, so that the intermediary does not have to be overloaded with authentication and access issues. With the employment of the present invention, the intermediate node can easily synchronize the access request messages between the local node and the global server. In addition, the disclosed invention also allows intermediaries to temporarily grant access to local nodes when the global network is lost.

This allows the local nodes to continue to communicate with one another when global connection is temporarily down. Packets sent to the global network are also queued so that once global connection is restored (and access is granted), these packets can be transmitted immediately without having to wait for the local nodes to re-transmit.

Features of the present invention are listed below.

(1) A network access control framework apparatus for controlling access to resources in a plurality of packet-switched data communications networks, wherein network elements, hereafter known as local nodes, in one or more data communications networks, hereafter known as local networks, are access controlled, and one or more data communications networks, hereafter known as global networks, are not access controlled by the said access control framework, comprises:

i. a singular or plurality of local access protocol units, wherein a local access protocol unit services access requests from local nodes using a specific access protocol;

ii. a singular or plurality of global access protocol units, wherein a global access protocol unit services access responses from one or more network elements, hereafter known as global servers, in the global network, wherein the global servers provide authoritative responses to access requests from the local nodes;

iii. a message mapping unit that maps the control messages used in the said singular or plurality of local access protocol units, and control messages used in the said singular or plurality of global access protocol units, to a generic set of control messages; and iv. a state machine to control the operation of the said network access control framework apparatus based on the said generic set of control messages.

(2) The set of generic control messages wherein the message mapping unit maps to and from the control messages used by the singular or plurality of local access protocol units and the singular or plurality of global access protocol units, as cited in (1) above, comprises:

i. an L-ACCESS-INIT generic control message that is used to inform local nodes that access request is required;

ii. an L-ACCESS-REQ generic control message that is sent from the local nodes to request access to the controlled network resources;

iii. a G-ACCESS-REQ generic control message that is used to inform the global server that a local node is requesting access to the controlled network resources;

iv. a G-AUTH-REQ generic control message that is sent from the global server to request authentication information on the local node that is requesting access to the controlled network resources;

v. an L-AUTH-REQ generic control message that is sent to the local node that is requesting access to the controlled network resources to request authentication information from the said local node;

vi. an L-AUTH-RES generic control message that is sent from the local node to provide authentication information that is sent from the local nodes to request access to the controlled network resources;

vii. a G-AUTH-RES generic control message that is used to send authentication information from the local node that is requesting access to the controlled network resources to the global server;

viii. a G-ACCESS-OK generic control message that is sent from the global server to indicate that the request of access to the controlled network resources by the local node is granted;

ix. an L-ACCESS-OK generic control message that is used to inform the local node that the request to access the controlled network resources is granted;

x. an L-LOGOFF generic control message that is sent from the local node to indicate the release of access to the controlled network resources;

xi. a G-LOGOFF generic control message that is sent to the global server to indicate the release of access to the controlled network resources by the local node;

xii. a G-ACCESS-REJ generic control message that is sent from the global server to indicate that the request for access to the controlled network resources by the local node is rejected; and xiii. an L-ACCESS-REJ generic control message that is used to inform the local node that the request to access the controlled network resources is rejected.

(3) The set of generic control messages as cited in (2) above wherein the message mapping unit maps to and from the control messages used by the singular or plurality of local access protocol units and the singular or plurality of global access protocol units as cited in (1) above, whereas an acknowledgement is necessary when an indication of release of access to the controlled network resources is required, further comprises the following additional control messages:

i. an L-LOGOFF-ACK generic control message that is used to acknowledge to the local node that the access to the controlled network resources is released; and ii. a G-LOGOFF-ACK generic control message that is sent from the global server to acknowledge the release of the access to the controlled network resources by the local node.

(4) By means of the message mapping unit cited in (2) above, control messages used by the singular or plurality of local access protocol units and the singular or plurality of global access protocol units, as cited in (1) above, are mapped to one of the generic control messages as cited in (2) above.

(5) By means of the message mapping unit cited in (3) above, control messages used by the singular or plurality of local access protocol units and the singular or plurality of global access protocol units, as cited in (1) above, are mapped to one of the generic control messages as cited in (3) above.

(6) The method used in the message mapping unit of the network access control framework apparatus, as cited in (1) above, to generalize the set of fifteen generic control messages cited in (3) above to the reduced set of thirteen generic control messages cited in (2) above, comprises the steps of:

i. mapping the L-LOGOFF-ACK generic control message to a null message, wherein no actual message is sent by the local access protocol unit, when no acknowledgement is necessary for the release of the access to the controlled network resources; and ii. mapping the G-LOGOFF-ACK generic control message to a virtual message, wherein the G-LOGOFF-ACK generic control message is assumed to have been received immediately after an indication of the release of the access to the controlled network resources is sent to the global server, when no acknowledgement is necessary for the release of the access to the controlled network resources.

(7) The message mapping unit cited in (1) above, wherein control messages used by the singular or plurality of local access protocol units and the singular or plurality of global access protocol units, as cited in (1) above, are mapped to one of the generic control messages as cited in (3) above, utilizes the method as cited in (6) above to generalize the set of fifteen generic control messages cited in (3) above to the reduced set of thirteen generic control messages cited in (2) above.

(8) The data format used by the network access control framework apparatus, as cited in (1) above, wherein a structure of the said data format is associated with a local node throughout the session beginning from a request for access to network resources to the release of the network resource, comprises:

i. a field that stores information about the associated local node, wherein the said field stores a sufficient amount of information such that the associated local node can be identified using the information;

ii. a field that stores the current status of the state machine, as cited in (1) above; and iii. a field that can be used to temporarily store data packets sent by the associated local node.

(9) The network access control framework apparatus for controlling access to resources in a plurality of packet-switched data communications networks, as cited in (1) above, further comprises a mechanism to switch the policy of the said network access control framework apparatus to one of the following:

i. in the case where it is determined that the connection to the global server is lost, momentarily or otherwise, the policy is to reject all ongoing or newly initiated requests for access to the said network resources during the period of time for which it remains so determined that the connection to the global server is lost; or ii. in the case where it is determined that the connection to the global server is lost, momentarily or otherwise, the policy is to accept all ongoing or newly initiated requests for access to the said network resources during the period of time for which it remains so determined that the connection to the global server is lost.

(10) The mechanism to switch the policy of the network access control framework apparatus for controlling access to resources in a plurality of packet-switched data communications networks, as cited in (1) above, switches to one of the following:

i. in the case where it is determined that the connection to the global server is lost, momentarily or otherwise, the policy is to reject all ongoing or newly initiated requests for access to the said network resources during the period of time for which it remains so determined that the connection to the global server is lost; or ii. in the case where it is determined that the connection to the global server is lost, momentarily or otherwise, the policy is to accept all ongoing or newly initiated requests for access to the said network resources during the period of time for which it remains so determined that the connection to the global server is lost.

(11) The set of states used in the state machine that controls the operation of the network access control framework apparatus, as cited in (1) above, comprises:

i. an S-ACC-WAIT state, wherein a control message is sent to the local node indicating that an access request is required, and the said state machine is waiting for an access request message to be sent by the local node;

ii. an S-RES-WAIT state, wherein a control message is sent to the global server indicating that an access request is made, and the said state machine is waiting for a response to be sent by the global server;

iii. an S-CONN state, wherein access to the requested network resources is granted to the local node;

iv. an S-DISCONN state, wherein the access to all network resources by the local node is released, and the structure with the data format specified in (8) above that is associated with the local node is deleted;

v. an S-CONN-LOST state, wherein the said state machine determines that connection to the global server is lost, and the policy specified in (9) above is set to allow access temporarily when connection to the global server is lost; and vi. an S-RESET-WAIT state, wherein the said state machine determines that connection to the global server is regained, whereas the prior state is the S-CONN-LOST state.

(12) The set of transitions between the states cited in (11) above, wherein these transitions are used in the state machine that controls the operation of the network access control framework apparatus, as cited in (1) above, comprises:

i. the transition from the S-ACC-WAIT state to the S-RES-WAIT state, provided by the condition that the local node has sent a control message to request access to the controlled network resource;

ii. the self-transition of the S-RES-WAIT state, provided by the condition that a control message in response to the request for access to the controlled network resource has not been received from the global server after a specified time period, wherein the number of self-transitions performed has not exceeded a specified threshold;

iii. the transition from the S-RES-WAIT state to the S-DISCONN state, provided by the condition that a control message in response to the request for access to the controlled network resource has not been received from the global server after a specified time period, wherein the number of self-transitions performed has exceeded a specified threshold and the policy is configured to reject the access request as cited in (9) and (10) above;

iv. the transition from the S-RES-WAIT state to the S-CONN-LOST state, provided by the condition that a control message in response to the request for access to the controlled network resource has not been received from the global server after a specified time period, wherein the number of self-transitions performed has exceeded a specified threshold and the policy is configured to accept the access request as cited in (9) and (10) above;

v. the transition from the S-RES-WAIT state to the S-CONN state, provided by the condition that the global server has sent a control message to accept the request for access to the controlled network resource, wherein during the said transition, a control message is sent to the local node indicating that the request for access to the controlled network resource is accepted;

vi. the transition from the S-RES-WAIT state to the S-DISCONN state, provided by the condition that the global server has sent a control message to accept the rejection of access to the controlled network resource, wherein during the said transition, a control message is sent to the local node indicating that the request for access to the controlled network resource is rejected;

vii. the transition from the S-CONN state to the S-DISCONN state, provided by the condition that a packet has not been received from the local node after a specified time period, wherein the number of self-transitions performed has exceeded a specified threshold;

viii. the transition from the S-CONN state to the S-DISCONN state, provided by the condition that a control message is received from the local node to indicate the release of the controlled network resources, wherein during the said transition, a control message is sent to the local node to acknowledge the release of the controlled network resources;

ix. the transition from the S-CONN-LOST state to the S-DISCONN state, provided by the condition that a control message is received from the local node to indicate the release of the controlled network resources, wherein during the said transition, a control message is sent to the local node to acknowledge the release of the controlled network resources;

x. the transition from the S-CONN-LOST state to the S-RESET-WAIT state, provided by the condition that the connection to the global server is determined to have been regained;

xi. the self-transition of the S-RESET-WAIT state, provided by the condition that a packet sent from the local node has not been received after a specified time period, wherein the number of self-transitions performed has not exceeded a specified threshold;

xii. the transition from the S-RESET-WAIT state to the S-DISCONN state, provided by the condition that a packet sent from the local node has not been received after a specified time period, wherein the number of self-transitions performed has exceeded a specified threshold;

xiii. the transition from the S-RESET-WAIT state to the S-DISCONN state, provided by the condition that a control message is received from the local node to indicate the release of the controlled network resources, wherein during the said transition, a control message is sent to the local node to acknowledge the release of the controlled network resources; and xiv. the transition from the S-RESET-WAIT state to the S-ACC-WAIT state, provided by the condition that a packet is received from the local node, whereas the said packet is not a control message to indicate the release of the controlled network resources.

(13) The state machine of the network access control framework apparatus, as cited in (1) above, utilizes the set of states cited in (11) above and the set of transitions between the said states cited in (12) above, to control the operation of the said network access control framework apparatus.

(14) The set of states, as cited in (11) above, used in the state machine that controls the operation of the network access control framework apparatus, as cited in (1) above, further comprises:

i. an S-INIT state, wherein a structure with the data format specified in (8) above is initialized, wherein the said structure is associated with the local node initiating the said state machine;

ii. an S-ACC-WAIT state, wherein a control message is sent to the local node indicating that an access request is required, and the said state machine is waiting for an access request message to be sent by the local node;

iii. an S-RES-WAIT state, wherein a control message is sent to the global server indicating that an access request is made, and the said state machine is waiting for a response to be sent by the global server;

iv. an S-AUTH-WAIT state, wherein a control message is sent to the local node indicating that authentication information is required, and the said state machine is waiting for an authentication response message to be sent by the local node;

v. an S-CONN state, wherein access to the requested network resources is granted to the local node;

vi. an S-LOGOFF state, wherein a control message is sent to the global server indicating the release of requested network resources, and the said state machine is waiting for an acknowledgement message to be sent by the global server;

vii. an S-DISCONN state, wherein the access to all network resources by the local node is released, and the structure with the data format specified in (8) above that is associated with the local node is deleted;

viii. an S-CONN-LOST state, wherein the said state machine determines that connection to the global server is lost, and the policy specified in (9) above is set to allow access temporarily when connection to the global server is lost; and ix. an S-RESET-WAIT state, wherein the said state machine determines that connection to the global server is regained, whereas the prior state is the S-CONN-LOST state.

(15) The set of transitions between the states cited in (14) above, wherein these transitions are used in the state machine that controls the operation of the network access control framework apparatus, as cited in (1) above, comprises:

i. the transition from the S-INIT state to the S-ACC-WAIT state, provided by the condition that the local node has not sent a control message to request access to the controlled network resource;

ii. the transition from the S-INIT state to the S-RES-WAIT state, provided by the condition that the local node has sent a control message to request access to the network resource;

iii. the self-transition of the S-ACC-WAIT state, provided by the condition that a control message to request access to the controlled network resource has not been received from the local node after a specified time period, wherein the number of self-transitions performed has not exceeded a specified threshold;

iv. the transition from the S-ACC-WAIT state to the S-DISCONN state, provided by the condition that a control message to request access to the controlled network resource has not been received from the local node after a specified time period, wherein the number of self-transitions performed has exceeded a specified threshold;

v. the transition from the S-ACC-WAIT state to the S-RES-WAIT state, provided by the condition that the local node has sent a control message to request access to the controlled network resource;

vi. the self-transition of the S-RES-WAIT state, provided by the condition that a control message in response to the request for access to the controlled network resource has not been received from the global server after a specified time period, wherein the number of self-transitions performed has not exceeded a specified threshold;

vii. the transition from the S-RES-WAIT state to the S-DISCONN state, provided by the condition that a control message in response to the request for access to the controlled network resource has not been received from the global server after a specified time period, wherein the number of self-transitions performed has exceeded a specified threshold and the policy is configured to reject the access request as cited in (9) and (10) above;

viii. the transition from the S-RES-WAIT state to the S-CONN-LOST state, provided by the condition that a control message in response to the request for access to the controlled network resource has not been received from the global server after a specified time period, wherein the number of self-transitions performed has exceeded a specified threshold and the policy is configured to accept the access request as cited in (9) and (10) above;

ix. the transition from the S-RES-WAIT state to the S-CONN state, provided by the condition that the global server has sent a control message to accept the request for access to the controlled network resource, wherein during the said transition, a control message is sent to the local node indicating that the request for access to the controlled network resource is accepted;

x. the transition from the S-RES-WAIT state to the S-DISCONN state, provided by the condition that the global server has sent a control message to accept the rejection of access to the controlled network resource, wherein during the said transition, a control message is sent to the local node indicating that the request for access to the controlled network resource is rejected;

xi. the transition from the S-RES-WAIT state to the S-AUTH-WAIT state, provided by the condition that the global server has sent a control message to request authentication information from the local node;

xii. the self-transition of the S-AUTH-WAIT state, provided by the condition that a control message in response to the request for authentication information has not been received from the local node after a specified time period, wherein the number of self-transitions performed has not exceeded a specified threshold;

xiii. the transition from the S-AUTH-WAIT state to the S-LOGOFF state, provided by the condition that a control message in response to the request for authentication information has not been received from the local node after a specified time period, wherein the number of self-transitions performed has exceeded a specified threshold;

xiv. the transition from the S-RES-WAIT state to the S-AUTH-WAIT state, provided by the condition that the global server has sent a control message to request authentication information from the local node;

xv. the self-transition of the S-CONN state, provided by the condition that a packet has not been received from the local node after a specified time period, wherein the number of self-transitions performed has not exceeded a specified threshold;

xvi. the transition from the S-CONN state to the S-LOGOFF state, provided by the condition that a packet has not been received from the local node after a specified time period, wherein the number of self-transitions performed has exceeded a specified threshold;

xvii. the self-transition of the S-CONN state, provided by the condition that a packet has been received from the local node, wherein the packet is not a control message to indicate the release of the controlled network resources;

xviii. the transition from the S-CONN state to the S-LOGOFF state, provided by the condition that a control message is received from the local node to indicate the release of the controlled network resources, wherein during the said transition, a control message is sent to the local node to acknowledge the release of the controlled network resources;

xix. the self-transition of the S-LOGOFF state, provided by the condition that an acknowledgement of the release of the controlled network resources has not been received from the global server after a specified time period, wherein the number of self-transitions performed has not exceeded a specified threshold;

xx. the transition from the S-LOGOFF state to the S-DISCONN state, provided by the condition that an acknowledgement of the release of the controlled network resources has not been received from the global server after a specified time period, wherein the number of self-transitions performed has exceeded a specified threshold;

xxi. the transition from the S-LOGOFF state to the S-DISCONN state, provided by the condition that an acknowledgement of the release of the controlled network resources has been received from the global server;

xxii. the transition from the S-CONN-LOST state to the S-DISCONN state, provided by the condition that a control message is received from the local node to indicate the release of the controlled network resources, wherein during the said transition, a control message is sent to the local node to acknowledge the release of the controlled network resources;

xxiii. the transition from the S-CONN-LOST state to the S-RESET-WAIT state, provided by the condition that the connection to the global server is determined to have been regained;

xxiv. the self-transition of the S-RESET-WAIT state, provided by the condition that a packet sent from the local node has not been received after a specified time period, wherein the number of self-transitions performed has not exceeded a specified threshold;

xxv. the transition from the S-RESET-WAIT state to the S-DISCONN state, provided by the condition that a packet sent from the local node has not been received after a specified time period, wherein the number of self-transitions performed has exceeded a specified threshold;

xxvi. the transition from the S-RESET-WAIT state to the S-LOGOFF state, provided by the condition that a control message is received from the local node to indicate the release of the controlled network resources, wherein during the said transition, a control message is sent to the local node to acknowledge the release of the controlled network resources; and xxvii. the transition from the S-RESET-WAIT state to the S-ACC-WAIT state, provided by the condition that a packet is received from the local node, whereas the said packet is not a control message to indicate the release of the controlled network resources.

(16) The state machine of the network access control framework apparatus, as cited in (1) above, utilizes the set of states cited in (14) above and the set of transitions between the said states cited in (15) above, to control the operation of the said network access control framework apparatus.

(17) The set of states, as cited in (11) above, used in the state machine that controls the operation of the network access control framework apparatus, as cited in (1) above, further comprises:

i. an S-INIT state, wherein a structure with the data format specified in (8) above is initialized, wherein the said structure is associated with the local node initiating the said state machine;

ii. an S-ACC-WAIT state, wherein a control message is sent to the local node indicating that an access request is required, and the said state machine is waiting for an access request message to be sent by the local node;

iii. an S-RES-WAIT state, wherein a control message is sent to the global server indicating that an access request is made, and the said state machine is waiting for a response to be sent by the global server;

iv. an S-AUTH-WAIT state, wherein a control message is sent to the local node indicating that authentication information is required, and the said state machine is waiting for an authentication response message to be sent by the local node;

v. an S-CONN state, wherein access to the requested network resources is granted to the local node;

vi. an S-DISCONN state, wherein the access to all network resources by the local node is released, and the structure with the data format specified in (8) above that is associated with the local node is deleted;

vii. an S-CONN-LOST state, wherein the said state machine determines that connection to the global server is lost, and the policy specified in (9) above is set to allow access temporarily when connection to the global server is lost; and viii. an S-RESET-WAIT state, wherein the said state machine determines that connection to the global server is regained, whereas the prior state is the S-CONN-LOST state.

(18) The set of transitions between the states cited in (17) above, wherein these transitions are used in the state machine that controls the operation of the network access control framework apparatus, as cited in (1) above, comprises:

i. the transition from the S-INIT state to the S-ACC-WAIT state, provided by the condition that the local node has not sent a control message to request access to the controlled network resource;

ii. the transition from the S-INIT state to the S-RES-WAIT state, provided by the condition that the local node has sent a control message to request access to the network resource;

iii. the self-transition of the S-ACC-WAIT state, provided by the condition that a control message to request access to the controlled network resource has not been received from the local node after a specified time period, wherein the number of self-transitions performed has not exceeded a specified threshold;

iv. the transition from the S-ACC-WAIT state to the S-DISCONN state, provided by the condition that a control message to request access to the controlled network resource has not been received from the local node after a specified time period, wherein the number of self-transitions performed has exceeded a specified threshold;

v. the transition from the S-ACC-WAIT state to the S-RES-WAIT state, provided by the condition that the local node has sent a control message to request access to the controlled network resource;

vi. the self-transition of the S-RES-WAIT state, provided by the condition that a control message in response to the request for access to the controlled network resource has not been received from the global server after a specified time period, wherein the number of self-transitions performed has not exceeded a specified threshold;

vii. the transition from the S-RES-WAIT state to the S-DISCONN state, provided by the condition that a control message in response to the request for access to the controlled network resource has not been received from the global server after a specified time period, wherein the number of self-transitions performed has exceeded a specified threshold and the policy is configured to reject the access request as cited in (9) and (10) above;

viii. the transition from the S-RES-WAIT state to the S-CONN-LOST state, provided by the condition that a control message in response to the request for access to the controlled network resource has not been received from the global server after a specified time period, wherein the number of self-transitions performed has exceeded a specified threshold and the policy is configured to accept the access request as cited in (9) and (10) above;

ix. the transition from the S-RES-WAIT state to the S-CONN state, provided by the condition that the global server has sent a control message to accept the request for access to the controlled network resource, wherein during the said transition, a control message is sent to the local node indicating that the request for access to the controlled network resource is accepted;

x. the transition from the S-RES-WAIT state to the S-DISCONN state, provided by the condition that the global server has sent a control message to accept the rejection of access to the controlled network resource, wherein during the said transition, a control message is sent to the local node indicating that the request for access to the controlled network resource is rejected;

xi. the transition from the S-RES-WAIT state to the S-AUTH-WAIT state, provided by the condition that the global server has sent a control message to request authentication information from the local node;

xii. the self-transition of the S-AUTH-WAIT state, provided by the condition that a control message in response to the request for authentication information has not been received from the local node after a specified time period, wherein the number of self-transitions performed has not exceeded a specified threshold;

xiii. the transition from the S-AUTH-WAIT state to the S-DISCONN state, provided by the condition that a control message in response to the request for authentication information has not been received from the local node after a specified time period, wherein the number of self-transitions performed has exceeded a specified threshold;

xiv. the transition from the S-RES-WAIT state to the S-AUTH-WAIT state, provided by the condition that the global server has sent a control message to request authentication information from the local node;

xv. the self-transition of the S-CONN state, provided by the condition that a packet has not been received from the local node after a specified time period, wherein the number of self-transitions performed has not exceeded a specified threshold;

xvi. the transition from the S-CONN state to the S-DISCONN state, provided by the condition that a packet has not been received from the local node after a specified time period, wherein the number of self-transitions performed has exceeded a specified threshold, wherein during the said transition, a control message is sent to the global server to indicate the release of the access to the controlled network resources;

xvii. the self-transition of the S-CONN state, provided by the condition that a packet has been received from the local node, wherein the packet is not a control message to indicate the release of the controlled network resources;

xviii. the transition from the S-CONN state to the S-DISCONN state, provided by the condition that a control message is received from the local node to indicate the release of the controlled network resources, wherein during the said transition, a control message is sent to the global server indicating the release of the access to the controlled network resources;

xix. the transition from the S-CONN-LOST state to the S-DISCONN state, provided by the condition that a control message is received from the local node to indicate the release of the controlled network resources;

xx. the transition from the S-CONN-LOST state to the S-RESET-WAIT state, provided by the condition that the connection to the global server is determined to have been regained;

xxi. the self-transition of the S-RESET-WAIT state, provided by the condition that a packet sent from the local node has not been received after a specified time period, wherein the number of self-transitions performed has not exceeded a specified threshold;

xxii. the transition from the S-RESET-WAIT state to the S-DISCONN state, provided by the condition that a packet sent from the local node has not been received after a specified time period, wherein the number of self-transitions performed has exceeded a specified threshold;

xxiii. the transition from the S-RESET-WAIT state to the S-DISCONN state, provided by the condition that a control message is received from the local node to indicate the release of the controlled network resources, wherein during the said transition, a control message is sent to the global server indicating the release of the access to the controlled network resources; and xxiv. the transition from the S-RESET-WAIT state to the S-ACC-WAIT state, provided by the condition that a packet is received from the local node, whereas the said packet is not a control message to indicate the release of the controlled network resources.

(19) The state machine of the network access control framework apparatus, as cited in (1) above, utilizes the set of states cited in (17) above and the set of transitions between the said states cited in (18) above, to control the operation of the said network access control framework apparatus.

(20) The method used in the network access control framework apparatus as cited in (1) above, to generalize the set of states as cited in (14) above and the set of transitions between the said states cited in (15) above, to the set of states as cited in (17) above and the set of transitions between the said states cited in (18) above, comprises the steps of:

i. configuring the parameters of the said network access control framework apparatus such that for the self-transition of the S-LOGOFF state, provided by the condition that an acknowledgement of the release of the controlled network resources has not been received from the global server after a specified time period, wherein the number of self-transitions performed has not exceeded a specified threshold, the said specified time period is so small a value that it is negligible with respect to the processing cycle of the said network access control framework apparatus, and the said specified threshold is set to a value of zero so that no self-transition can occur; and ii. configuring the parameters of the said network access control framework apparatus such that for the transition from the S-LOGOFF state to the S-DISCONN state, provided by the condition that an acknowledgement of the release of the controlled network resources has not been received from the global server after a specified time period, wherein the number of self-transitions performed has exceeded a specified threshold, the said specified time period is so small a value that it is negligible with respect to the processing cycle of the said network access control framework apparatus, and the said specified threshold is set to a value of zero so that a transition to the S-DISCONN state must occur when the said specified time period elapses.

(21) The state machine of the network access control framework apparatus, as cited in (1) above, utilizes the set of states cited in (14) above, the set of transitions between the said states cited in (15) above, and the method cited in (20) above to generalize the set of states cited in (14) above to the set of states cited in (17) above, and the set of transitions between the said states cited in (15) above to the set of transitions between the said states cited in (18) above, to control the operation of the said network access control framework apparatus.

(22) The method used in the network access control framework apparatus as cited in (1) above, to process a data packet sent by a local node, comprises the steps of:

i. searching for a structure with the data format as cited in (8) above that is associated with the local node, and if not found, instantiating a new instance of the state machine as cited in (1) above to process the said packet;

ii. when the said structure is found, having the said packet processed by the state machine as cited in (1) above if it contains a control message that corresponds to one of the generic control messages cited in (2) and (3) above;

iii. when the said packet does not contain any control messages that correspond to one of the generic control messages cited in cited in (2) and (3) above, and the state of the state machine as cited in (1) above is the state in which access to the controlled network resources is granted, forwarding the said packet to its intended recipient;

iv. when the said packet does not contain any control messages that correspond to one of the generic control messages cited in (2) and (3) above, and the state of the state machine as cited in (1) above is not the state in which access to the global server is determined to be lost, nor the state in which access to the controlled network resources is granted, queuing the said packet in the said structure associated with the local node;

v. when the said packet does not contain any control messages that correspond to one of the generic control messages cited in (2) and (3) above, and the state of the state machine as cited in (1) above is the state in which access to the global server is determined to be lost, and the policy as cited in (9) above is configured to accept access requests, and the intended recipient of the said packet is in a data communications network that is controlled by the said network access control framework apparatus, forwarding the said packet to its intended recipient; and vi. when the said packet does not contain any control messages that correspond to one of the generic control messages cited in (2) and (3) above, and the state of the state machine as cited in (1) above is the state in which access to the global server is determined to be lost, and the policy as cited in (9) above is configured to accept access requests, and the intended recipient of the said packet is in a data communications network that is not controlled by the said network access control framework apparatus, queuing the said packet in the said structure associated with the local node.

(23) The network access control framework apparatus, as cited in (1) above utilizes the method cited in (22) above to process data packets that are sent by a local node.

(24) The mechanism utilized in the network access control framework apparatus, as cited in (1) above, wherein the said mechanism allows the network access control framework to temporarily store packets sent by a local node intended for some other node when the said local node has not yet been granted access to the controlled network resources, comprises the step of, when the said packet does not contain any control messages that correspond to one of the generic control messages cited in (2) and (3) above, and the state of the state machine as cited in (1) above is not the state in which access to the global server is determined to be lost, nor the state in which access to the controlled network resources is granted, queuing the said packet in a structure with the data format cited in (8) above, wherein the said structure is associated with the local node.

(25) The network access control framework apparatus, as cited in (1) above, wherein the said network access control framework utilizes the mechanism cited in (24) above to temporarily store packets sent by a local node intended for some other node when the said local node has not yet been granted access to the controlled network resources, comprises the step of, when the said packet does not contain any control messages that correspond to one of the generic control messages cited in (2) and (3) above, and the state of the state machine as cited in (1) above is not the state in which access to the global server is determined to be lost, nor the state in which access to the controlled network resources is granted, queuing the said packet in a structure with the data format cited in (8) above, wherein the said structure is associated with the local node.

(26) The mechanism utilized in the network access control framework apparatus as cited in (1) above, wherein the said mechanism allows the network access control framework to temporarily store packets sent by a local node when the connection to the said local node has not yet been granted access to the controlled network resources by the global server cited in (1) above, wherein the said data packet is intended for some other node in a data communications network that is not controlled by the said network access control framework apparatus, comprises the step of, when the said packet does not contain any control messages that correspond to one of the generic control messages cited in (2) and (3) above, and the state of the state machine as cited in (1) above is the state in which access to the global server is determined to be lost, and the policy as cited in (9) above is configured to accept access requests, and the intended recipient of the said packet is in a data communications network that is not controlled by the said network access control framework apparatus, queuing the said packet in the said structure associated with the local node.

(27) The network access control framework apparatus as cited in (1) above, wherein the said network access control framework apparatus utilizes the mechanism cited in (26) above to temporarily store packets sent by a local node when the connection to the said local node has not yet been granted access to the controlled network resources by the global server cited in (1) above, wherein the said data packet is intended for some other node in a data communications network that is not controlled by the said network access control framework apparatus, comprises the step of, when the said packet does not contain any control messages that correspond to one of the generic control messages cited in (2) and (3) above, and the state of the state machine as cited in (1) above is the state in which access to the global server is determined to be lost, and the policy as cited in (9) above is configured to accept access requests, and the intended recipient of the said packet is in a data communications network that is not controlled by the said network access control framework apparatus, queuing the said packet in the said structure associated with the local node.

This application is based on Japanese Patent Application No. 2002-276195 filed on Sep. 20, 2002, the entire content of which is expressly incorporated by reference herein.

Industrial Applicability

The present invention is applicable to access control in an intermediate network element connecting a plurality of data communications networks.

The invention claimed is:

1. An access control method in an intermediate network element for connecting a plurality of data communication networks including a local network and a global network, in a network system where, when a local node in the local network performs communication, authentication by a global node in the global network is required, the method comprising the steps of:

in the intermediate network element, contacting the global node and controlling an access from the local node in the local network to the local network and to the global network;

determining, in the intermediate network element, whether or not a connection between the intermediate network element and the global node in the global network is suspended;

in the intermediate network element, when the connection between the intermediate network element and the global node is determined to be suspended, granting or rejecting an access request from the local node according to a policy of the intermediate network element;

in the intermediate network element, when packet data transmitted from the local node, which is granted access, addresses another local node, transferring the packet data from the local node to the other local node;

in the intermediate network element, when the intermediate network element grants the access request from the local node, transmitting to the local node a message indicating that the access request has been granted; and in the intermediate network element, changing protocols between a global access message protocol and a local access message protocol, the global access message protocol being used when the intermediate network element contacts the global node, the local access message protocol being used when the intermediate network element receives the access request from the local node and returns an access grant or an access rejection to the local node, and the global access message protocol being different from the local access message protocol.

* * * * *